(12) United States Patent
Borgianni et al.

(10) Patent No.: US 8,875,099 B2
(45) Date of Patent: Oct. 28, 2014

(54) MANAGING SYMBOLIC LINKS IN DOCUMENTATION

(75) Inventors: Marco Borgianni, Rome (IT); Fabio D'Alfonso, Rome (IT); Giangiacomo Tedeschi, Rome (IT); Viviana Tripodi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/335,179

(22) Filed: Dec. 22, 2011

(65) Prior Publication Data
US 2013/0167118 A1    Jun. 27, 2013

(51) Int. Cl.
G06F 9/44    (2006.01)

(52) U.S. Cl.
USPC .......................................... 717/121; 717/120

(58) Field of Classification Search
None
See application file for complete search history.

(56) References Cited

U.S. PATENT DOCUMENTS

| | | | |
|---|---|---|---|
| 5,717,860 A * | 2/1998 | Graber et al. ................. | 709/227 |
| 5,802,299 A * | 9/1998 | Logan et al. .................. | 709/218 |
| 6,578,078 B1 * | 6/2003 | Smith et al. ................... | 709/224 |
| 6,601,066 B1 * | 7/2003 | Davis-Hall .............................. | 1/1 |
| 6,606,653 B1 * | 8/2003 | Ackermann et al. .......... | 709/219 |
| 6,788,313 B1 | 9/2004 | Heil | |
| 6,802,061 B1 * | 10/2004 | Parthasarathy et al. ....... | 717/173 |
| 7,065,780 B2 * | 6/2006 | Barbier et al. ................. | 725/112 |
| 7,290,131 B2 | 10/2007 | Beynon et al. | |
| 7,290,205 B2 | 10/2007 | Moncsko et al. | |
| 7,305,616 B1 | 12/2007 | Nelson et al. | |
| 7,392,303 B2 | 6/2008 | Smith et al. | |
| 7,493,613 B2 * | 2/2009 | D'Souza et al. .............. | 717/173 |
| 7,568,184 B1 | 7/2009 | Roth | |
| 7,689,667 B2 | 3/2010 | Lal | |
| 8,190,711 B1 * | 5/2012 | Borodich ....................... | 709/219 |
| 8,438,279 B2 * | 5/2013 | Brundage et al. ............. | 709/224 |
| 2002/0052889 A1 | 5/2002 | Shinoda | |
| 2003/0158953 A1 | 8/2003 | Lal | |
| 2003/0182417 A1 * | 9/2003 | Hasunuma .................... | 709/223 |
| 2004/0210653 A1 * | 10/2004 | Kanoor et al. ................ | 709/223 |
| 2004/0267726 A1 | 12/2004 | Beynon et al. | |
| 2005/0240827 A1 | 10/2005 | Sankaran et al. | |
| 2006/0150090 A1 | 7/2006 | Swamidass | |
| 2007/0174324 A1 * | 7/2007 | Palapudi et al. .............. | 707/102 |
| 2008/0120533 A1 * | 5/2008 | Lazier et al. .................. | 715/234 |
| 2008/0263193 A1 | 10/2008 | Chalemin et al. | |
| 2009/0172154 A1 | 7/2009 | Aviles Sanchez et al. | |
| 2010/0332583 A1 * | 12/2010 | Szabo ........................... | 709/202 |
| 2011/0225181 A1 * | 9/2011 | Kubicki et al. ............... | 707/769 |
| 2013/0167118 A1 * | 6/2013 | Borgianni et al. ............ | 717/121 |

* cited by examiner

*Primary Examiner* — Don Wong
*Assistant Examiner* — Marina Lee
(74) *Attorney, Agent, or Firm* — Cuenot, Forsythe & Kim, LLC (57) ABSTRACT

A method of managing links can include inserting a universal resource identifier for a software asset within a link resolution file, wherein a symbolic link within a document that is independent of the link resolution file references the link resolution file. The method also can include publishing the document and the link resolution file and, responsive to a selection of the symbolic link within the document, resolving the symbolic link to the universal resource identifier using the link resolution file.

20 Claims, 5 Drawing Sheets

This is example text in a document. The document includes symbolic links to different software assets.

The first symbolic link is for a direct download.

The second symbolic link for a Website.

160       165
                    405

```
<section link name="first symbolic link">
    <url>http://ibm.com/fwlink/?LinkId=043</ url>
    <filename>example.dll</filename>
    <size>5820</size>
    <date>12-08-2011</date>
</section link>
```

```
<section link name="second symbolic link">
    <url>http://www.ibm.com</url>
    <source>source code inserted here</source>
</section link>
```

MANAGING SYMBOLIC LINKS IN DOCUMENTATION

BACKGROUND

One or more embodiments disclosed within this specification relate to managing links within documentation.

Links such as Universal Resource Identifiers (URIs), which include Universal Resource Locators (URLs) and the like, are routinely used within documentation. In product documentation, for example, links to Websites are often used to provide the reader with supplemental information. For example, a link within documentation can direct the reader to a download such as a software patch or further reference material that may be beyond the scope of the documentation that includes the link.

Links to Websites, however, are subject to change and can become obsolete. As such, any document that includes obsolete or "broken" links also becomes, at least in part, obsolete or inaccurate at a minimum.

BRIEF SUMMARY

One or more embodiments disclosed within this specification relate to managing links within documentation.

An embodiment can include a method of managing links. The method can include inserting a universal resource identifier for a software asset within a link resolution file, wherein a symbolic link within a document that is independent of the link resolution file references the link resolution file. The method also can include publishing the document and the link resolution file and, responsive to a selection of the symbolic link within the document, resolving the symbolic link to the universal resource identifier using the link resolution file.

Another embodiment can include a system for managing links. The system can include a processor configured to initiate and/or perform the various executable operations and/or functions disclosed within this specification.

Another embodiment can include a computer program product for managing links. The computer program product can include a computer readable storage medium having computer readable program code embodied therewith. The computer readable program code can be configured to perform the various executable operations and/or functions disclosed within this specification.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments disclosed within this specification relate to managing links within documentation. In accordance with the inventive arrangements disclosed within this specification, symbolic links can be used within documentation in lieu of explicitly defined links such as, for example, hard links, that directly specify a particular software asset. Each symbolic link within the documentation can point to a file that can include information necessary to resolve the symbolic link. The documentation can be published and stored with the file. Responsive to a selection of the symbolic link, the file can be accessed to resolve the symbolic link. Accordingly, a request for the software asset specified by the URI in the file can be issued to retrieve and/or obtain the software asset.

By separating the documentation from the mechanism, e.g., the URI, used to retrieve the particular software asset referenced in the documentation, the file can be updated without having to modify the documentation. For example, editing the file allows one to modify the manner in which a symbolic link in the documentation is resolved. The documentation can be exposed to users through publication, while the file including symbolic link resolution information is not exposed or otherwise available to users given access to the documentation. Accordingly, the URI that is ultimately used to resolve a symbolic link can be edited without requiring the documentation to be modified, pulled from publication, and/or re-published. Further aspects of the one or more embodiments disclosed within this specification will be apparent from the specification with reference to the figures.

Figure 1:
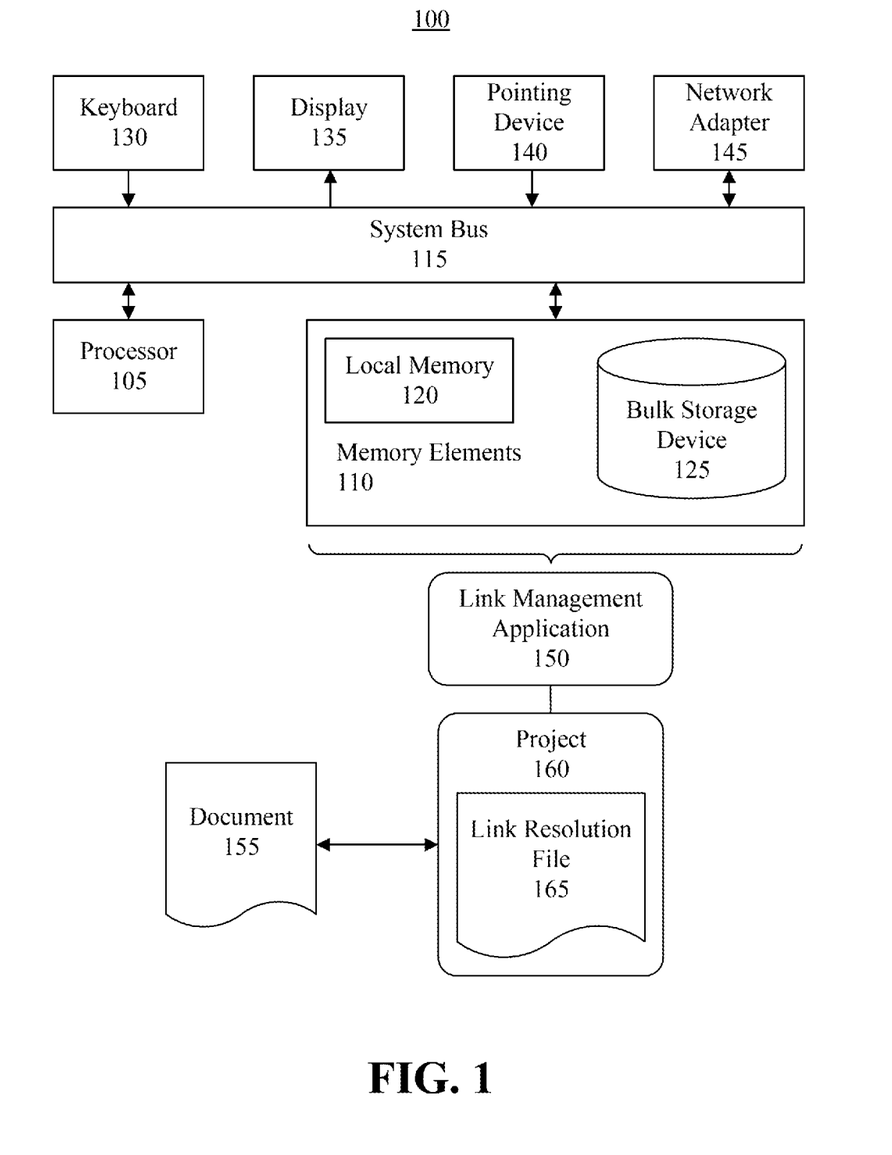
FIG. 1 is a block diagram illustrating a system for link management in accordance with an embodiment disclosed within this specification.

FIG. 1 is a block diagram illustrating a system 100 for link management in accordance with an embodiment disclosed within this specification. System 100 can include at least one processor 105 coupled to memory elements 110 through a system bus 115 or other suitable circuitry. As such, system 100 can store program code within memory elements 110. Processor 105 can execute the program code accessed from memory elements 110 via system bus 115. In one aspect, for example, system 100 can be implemented as a computer that is suitable for storing and/or executing program code. It should be appreciated, however, that system 100 can be implemented in the form of any system including a processor and memory that is capable of performing the functions and/or operations described within this specification.

Memory elements 110 can include one or more physical memory devices such as, for example, local memory 120 and one or more bulk storage devices 125. Local memory 120 refers to random access memory or other non-persistent memory device(s) generally used during actual execution of the program code. Bulk storage device(s) 125 can be implemented as a hard drive or other persistent data storage device. System 100 also can include one or more cache memories (not shown) that provide temporary storage of at least some program code in order to reduce the number of times program code must be retrieved from bulk storage device 125 during execution.

Input/output (I/O) devices such as a keyboard 130, a display 135, and a pointing device 140 optionally can be coupled to system 100. The I/O devices can be coupled to system 100 either directly or through intervening I/O controllers. One or more network adapters 145 also can be coupled to system 100 to enable system 100 to become coupled to other systems, computer systems, remote printers, and/or remote storage devices through intervening private or public networks. Modems, cable modems, and Ethernet cards are examples of different types of network adapters 145 that can be used with system 100.

As pictured in FIG. 1, memory elements 110 can store a link management application 150. Link management application 150, being implemented in the form of executable program code, can be executed by system 100 and, as such, can be considered part of system 100. In general, system 100, in executing link management application 150, facilitates the inclusion of symbolic links within documentation illustrated as document 155. Information necessary to resolve the symbolic link(s) inserted into document 155 can be located in a project 160 and, more particularly, within a link resolution file 165 within project 160.

Document 155 can be implemented as any of a variety of electronic document and/or file types including combinations of multiple different files. For example, document 155 can be implemented as a markup language document such as a HyperText Markup Language (HTML) document, a Webpage, a collection of Webpages, a text document, a word processing document, a spread sheet document, a presentation document, or the like. In one aspect, document 155 can be implemented as any electronic document that is capable of including a symbolic link and that can include content that is readable or otherwise accessible by a user. For example, document 155 can represent a product manual or online documentation that is to be made available over the Internet or an intranet.

Link resolution file 165 can be implemented as any of a variety of electronic document and/or file types capable of storing information necessary to resolve a symbolic link. For example, link resolution file 165 can be implemented as a text file, a word processing file, or a markup language file such as an eXtensible Markup Language (XML) file, or the like.

As shown, link resolution file 165 can be stored within project 160 that can be created by system 100. Project 160 can include a reference to document 155 stored therein. In one aspect, for example, the reference to document 155 can be stored within link resolution file 165. In either case, project 160 is associated with document 155.

After creation, document 155 and project 160 can be published. As used within this specification, publication can include storing in a computing system such as a server or other location at which document 155 can be accessed by one or more users other than the author of document 155. Publication, for example, can refer to the act of making document 155 available on a server, on an intranet site, on a Website, or the like. In one aspect, document 155 can remain stored in the same location as prior to publication, but have one or more rights associated therewith altered so that one or more users other than the author can access document 155.

Project 160 can be published with document 155, e.g., stored on a same server and/or where document 155 resides or is stored. While document 155 is available or exposed to users other than the author for access, project 160, while published with document 155, is not. Project 160 is accessed by activation or selection of symbolic links within document 155 or by a user with suitable access, e.g., administrative or author level access, to document 155 through system 100. Project 160 is not directly accessed by users that are not administrators or authors within system 100. Accordingly, subsequent modifications to the way in which symbolic links in document 155 are resolved can be implemented by accessing project 160 via system 100 and changing link resolution file 165. This procedure avoids editing document 155, removing document 155 from publication, and/or subsequently re-publishing document 155 after a modification.

In general, a "link" can refer to a URI, for example, a uniform resource locator (URL), a path, an address, and/or a hard link that specifies the location of a software asset in a computing network and/or environment. A "symbolic link," which is to be distinguished from a "link," is a software object that refers, or points, to another software object. For example, the symbolic link includes, at least in part, a link as part of the symbolic link software object to another software object. In one aspect, a symbolic link is resolved automatically by the file system or operating system in which the symbolic link exists. In the case of a server, e.g., a Web or Hypertext Transfer Protocol (HTTP) server, the server itself can be configured to automatically resolve the symbolic link. A program, for example, when referencing a symbolic link, sees the target software object, e.g., the software object to which the symbolic link points, regardless of whether the program is aware of the existence of the symbolic link itself or not.

By comparison, other types of software objects can point to other software objects, but are not resolved automatically by the file system. Rather, each application that accesses the software object must include the programming necessary to interpret the software object as an entity that points to another entity in order to determine the particular target object to which the software object points. A "shortcut" in a Windows® type of operating system is one example of a software object that is resolved by an application as opposed to the file system. Thus, an application that does not include the programming necessary to interpret a shortcut simply sees the shortcut as a software object, e.g., a file. The program does not see beyond the shortcut to the target object referenced by the shortcut. In further illustration, a hard link, e.g., a URI, can be considered a software object that an application resolves with awareness of what the hard link is, in that the application is aware that it (i.e., the application) is interacting with a hard link and not the software asset referenced by the hard link.

Once document 155 and project 160 are published, users can access document 155. Responsive to selection of a symbolic link within document 155, the client system used by the user is directed automatically to the link resolution file 165, which includes the information necessary to resolve the selected symbolic link. In this manner, each symbolic link within document 155 can be resolved, in effect, at runtime responsive to a selection by a user.

Figure 2:
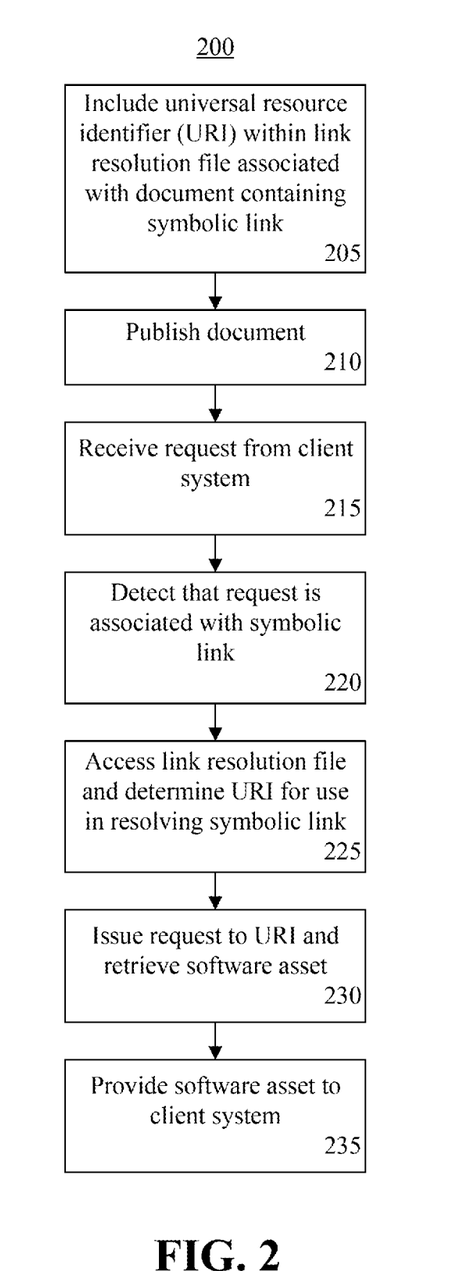
FIG. 2 is a flow chart illustrating a method of managing links in accordance with another embodiment disclosed within this specification.

FIG. 2 is a flow chart illustrating a method 200 of managing links in accordance with another embodiment disclosed within this specification. Method 200 can be performed, at least in part, using system 100 as described with reference to FIG. 1. In step 205, the system can insert, e.g., include, a URI within a link resolution file, e.g., within a project. The link resolution file can be associated with a document that includes a symbolic link referencing the link resolution file. In step 210, the system can publish the document and the project, e.g., to a server such as a Web, HTTP, File Transfer Protocol (FTP) server or the like.

Subsequent to publication a client system can access the document. Responsive to a client system selection of the symbolic link in the document, the system can resolve the symbolic link using the link resolution file. The resolution of the symbolic link is illustrated in further detail with reference to steps 215-235. In general, responsive to a selection of the symbolic link in the document, the symbolic link can be resolved using the link resolution file in the published project which can be hosted in the same location as the document. The URI from the link resolution file associated with the symbolic link can be determined. Accordingly, a request can be issued to the URI to obtain the software asset located at the URI.

For example, in step 215, the system can receive a request from a client system. The client system can issue the request responsive to a selection of the symbolic link in the document by a user of the client system. The symbolic link itself can specify the particular location, e.g., a link, to which the request is to be directed. For example, the symbolic link can include a URI or other address corresponding to that of the link resolution file. In step 220, the system can detect that the request is associated with, or generated from, a symbolic link and, as such, requires resolution. For example, the request can specify one or more parameters, e.g., the destination specifying the link resolution file, indicating that the request is from a symbolic link. The request can specify, for example, a <url> parameter from the symbolic link which can point to, or specify, the link resolution file. The <url> parameter further can specify a location within the link resolution file.

In step 225, the system can access the link resolution file and determine the particular URI to be used in resolving the symbolic link in the document. In step 230, the system can issue a request to the URI, e.g., establish a connection, and retrieve the software asset located at the URI. In step 235, the system can return the software asset to the client system. The software asset can be presented to the client system as if the client system has initially selected a hard link in the document to the software asset.

It should be appreciated that the particular system used to create the project that is published with the document and the system that subsequently receives a client system request requiring resolution may or may not be the same system. In one aspect, for example, the system that an author uses to create the project can be a client-based system, a server-based system, or a Web-based system. In this regard, the system that hosts the document and the project, e.g., the system to which the document and the project are published, can be different from the system used to create and publish the project.

Figure 3:
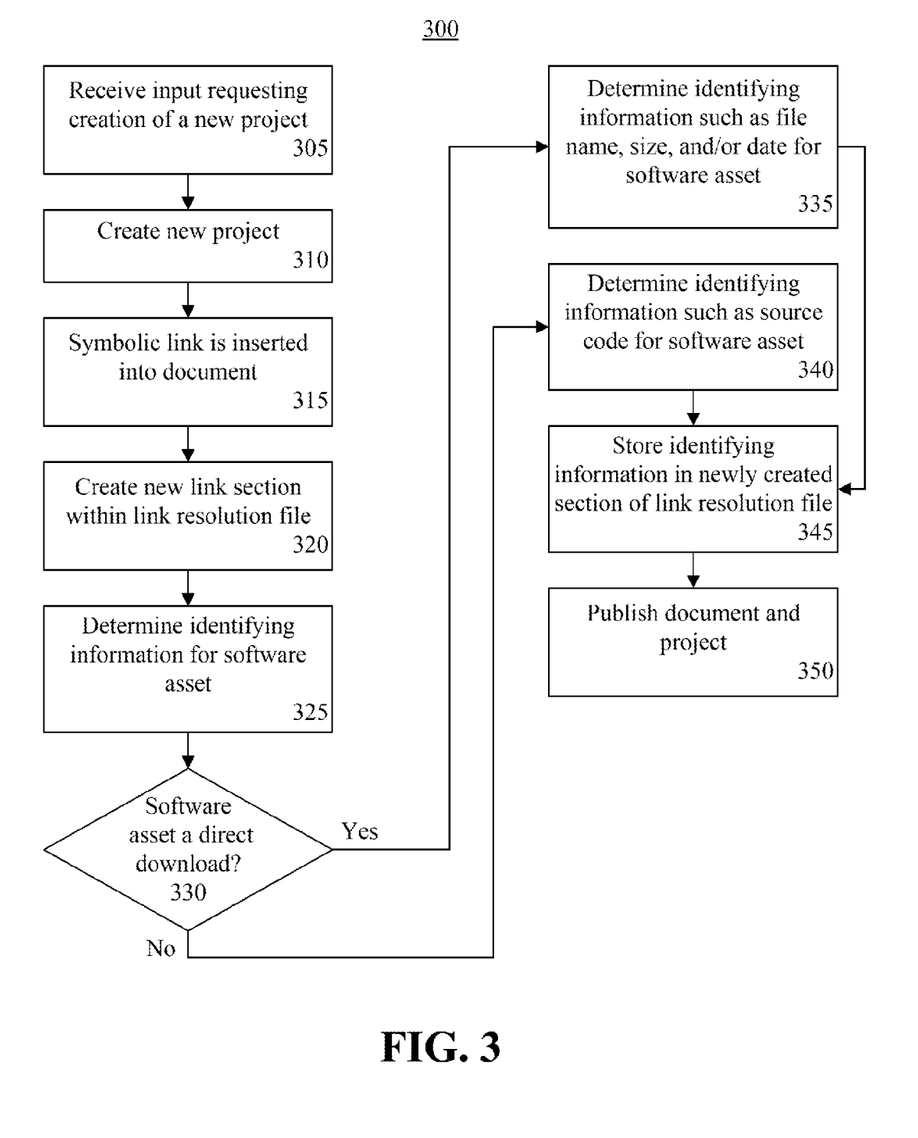
FIG. 3 is a flow chart illustrating a method of managing links in accordance with another embodiment disclosed within this specification.

FIG. 3 is a flow chart illustrating a method 300 of managing links in accordance with another embodiment disclosed within this specification. More particularly, method 300 illustrates an exemplary use case in which a user creates a project. Method 300 can be implemented using system 100 of FIG. 1.

In step 305, the system can receive a user input requesting the creation of a new project. For example, the user input can specify a name for the project being created, a name and/or location of the document that includes, or is to include, the symbolic link(s), and the name of a link resolution file that can be created by the system. In step 310, the system can create a project. The project can include a reference to the document and a link resolution file created by the system using the user provided name.

In step 315, a symbolic link can be inserted into the document. In one aspect, the system can automatically create a symbolic link with the document in response to a user request. The user, in requesting creation of the symbolic link, can specify the location and provide a name of the symbolic link. For example, the text that appears as selectable text in the document can be the "name" of the symbolic link with the actual symbolic link that references the link resolution file being hidden from view in the document. In another aspect, the user can manually create a symbolic link in the document. In either case, the symbolic link can reference the link resolution file created as part of the project.

In step 320, the system can create a new link section within the link resolution file. In one aspect, the user can provide an input requesting creation of a new section link in the link resolution file. Accordingly, the user can provide information such as the name of the symbolic link that was created in the document and the URI to which the symbolic link is to resolve. The system can insert the name of the symbolic link and the URI in the newly created section within the link resolution file.

In another aspect, the system can automatically create the new section within the link resolution file. For example, the new section can be created automatically responsive to creation of the symbolic link in the document or responsive to the user request to create a symbolic link in the document using the user provided name of the symbolic link. In that case, the user still can provide the URI to which the symbolic link is to resolve to the system for inclusion in the newly created section of the link resolution file corresponding to the symbolic link.

In step 325, the system can determine identifying information for the software asset specified by the URI. For example, the system can automatically send a request to the URI to obtain the software asset. In one aspect, the software asset can be one of two different varieties. One variety can be a direct download type of software asset in that the URI is for a downloadable software object such as a file that is hosted at the specified URI. Another variety can be a software asset that is not a direct download, but rather is a Webpage that is to be visually rendered by client system of a user. In either case, the system can determine identifying information for the software asset.

The identifying information for the software asset can be stored within the link resolution file or within another file specified in the link resolution file. For example, the system can store the identifying information within the newly created section within the link resolution file, thereby associating the identifying information with the URI, the software asset, and the symbolic link. In another example, the system can store the identifying information in a separate file in the project and include a reference to the file including the identifying information in the newly created section of the link resolution file.

In step 330, the system can determine whether the software asset is a direct download. For example, responsive to the request for the software asset issued by the system to the URI, the system hosting the software asset will respond. At that time, the system can determine the type of the software asset at the URI. Responsive to determining that the software asset is a direct download, method 300 can continue to step 335.

Responsive to determining that the software asset is not a direct download, method 300 can continue to step 340.

In step 335, when the software asset is a direct download, the system can determine identifying information. The identifying information for a direct download type of software asset can include, but is not limited to, the file name of the software asset, the size of the software asset, and/or a date of the software asset. The date of the software asset can include the date of creation, the date of modification, signature date of the software asset, or any combination thereof.

In step 340, when the software asset is not a direct download, e.g., is a Webpage, the system can determine identifying information. The identifying information for a software asset that is not a direct download can include the source code of the software asset. For example, the source code, e.g., markup language, of the Webpage can be obtained.

In step 345, the system can store the obtained identifying information for the software asset. In one aspect, identifying information for a direct download type of software asset can be stored within the newly created section of the link resolution file. In another aspect, the identifying information for a Webpage type of software asset can be stored in a file separate from, and reference by, the newly created section of the link resolution file. It should be appreciated, however, that the identifying information for the Webpage also can be stored within the newly created section of the link resolution file. Accordingly, the identifying information for the software asset is associated with the symbolic link and the URI for the software asset. The process described with reference to steps 315-345 can be repeated as necessary for each additional symbolic link that may be inserted into the document.

In step 350, responsive to a user request to do so, the system can publish the document and the project. Subsequently, a user can view or download the document. Responsive to the user selecting the symbolic link within the document, the user, e.g., the client system of the user executing a browser or other application, can be directed to the symbolic link resolution file, where the client system is provided with the URI of the software asset associated with the symbolic link. Accordingly, the user's client system can issue a request for the software asset from the URI as determined from the link resolution file.

Figure 4:
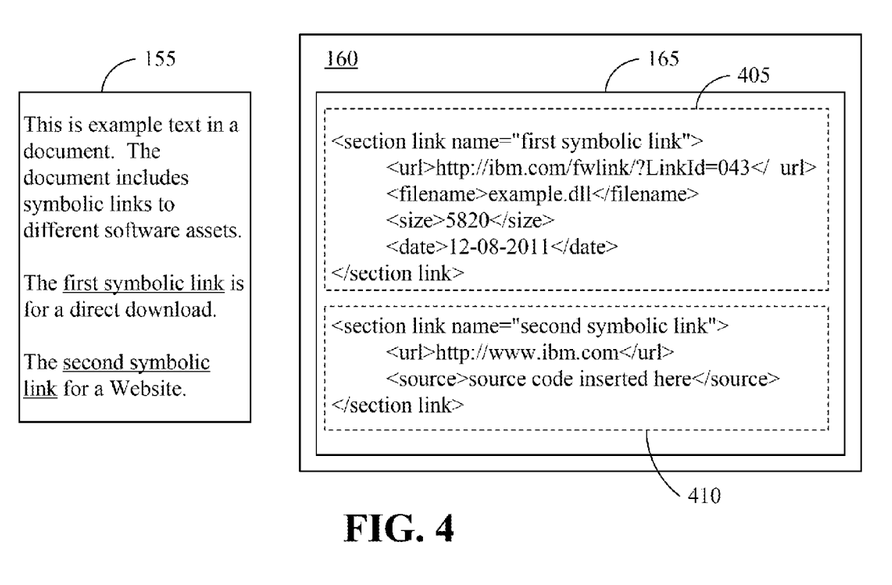
FIG. 4 is a block diagram illustrating an example of a project as described with reference to FIGS. 1-3 of this specification.

FIG. 4 is a block diagram illustrating an example of a project such as project 155 as described with reference to FIGS. 1-3. Like numbers will be used to refer to the same items throughout this specification. As shown, document 155 includes text in addition to a first symbolic link and a second symbolic link. Each symbolic link is underlined within document 155. More particularly, within document 155, a name or reference for each symbolic link is displayed with underlining indicating that the name is selectable. The actual symbolic link is abstracted from view of the user accessing document 155. It should be appreciated that underlining is used for purposes of illustration and that other techniques for visually distinguishing symbolic links within document 155 and indicating that such names can be selected can be used without limitation.

In this example, the user (e.g., author) has provided the URI to which each symbolic link is to resolve. As shown, the system has obtained identifying information for each of the first and the second symbolic links within link resolution file 165. The first symbolic link points to section 405 named "first symbolic link" in link resolution file 165. In this example, the system has determined that the URI used to resolve the first symbolic link points to a direct download type of software asset. Accordingly, the identifying information for the software asset has been obtained and inserted into section 405 of link resolution file 165 in association with the first symbolic link.

The second symbolic link points to section 410 named "second symbolic link." The system has determined that the URI to which the second symbolic link resolves refers to a Webpage type of software asset. Accordingly, identifying information for the software asset, e.g., the Webpage, is downloaded and inserted into section 410. As discussed, in another aspect, section 410 can store a reference, e.g., a path, to a different file into which the identifying information, which can be source code in this example, is stored.

In one or more other aspects, the system can be configured to perform administrative functions from time to time, periodically, or as requested by a system administrator. In that case, the system can be configured to determine whether one or more or all URIs within a given symbolic link file are broken.

Figure 5:
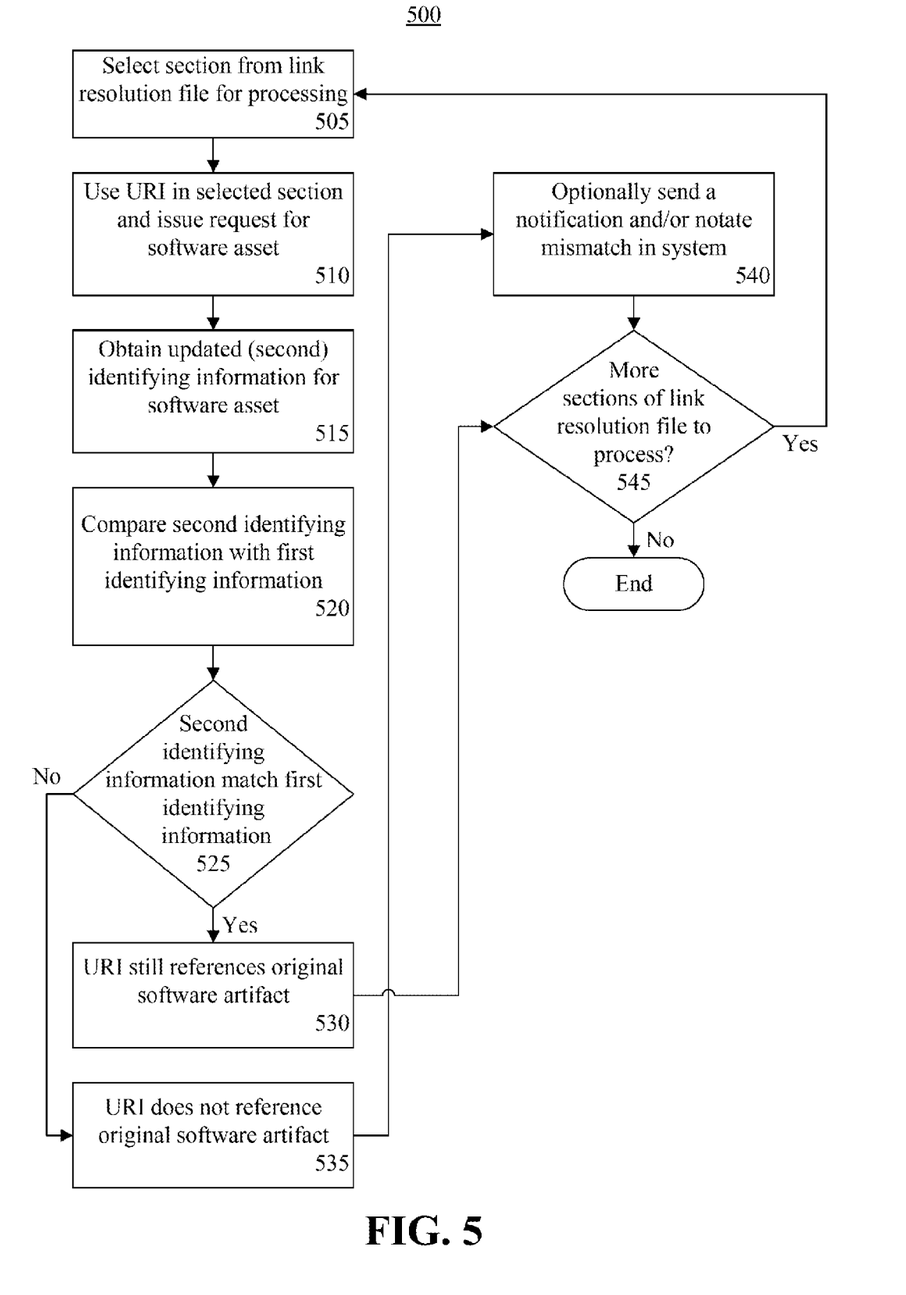
FIG. 5 is a flow chart illustrating a method of managing links in accordance with another embodiment disclosed within this specification.

FIG. 5 is a flow chart illustrating a method 500 of managing links in accordance with another embodiment disclosed within this specification. Method 400 can be performed by the system illustrated with reference to FIGS. 1-4 of this specification. As discussed, the functionality described with reference to FIG. 5 can be initiated automatically by the system on a periodic basis, from time-to-time, e.g., as requested by a system administrator, or responsive to some detected event. In any case, method 500 can begin in a state where the system is operational and configured to check for broken URIs within a selected link resolution file.

In step 505, the system can select a section, e.g., a first section, of the link resolution file. In step 510, the system can use the URI in the selected section and issue a request to the URI for the software asset. In step 515, the system can acquire updated identifying information for the software asset. It should be appreciated that the type of information that is obtained can be substantially the same as or identical to that described with reference to FIG. 3. For example, identifying information already stored for the software asset can be referred to as "first identifying information," while information that is newly obtained can be referred to as "second identifying information" or "updated identifying information."

In step 520, the system can compare the second identifying information with the first identifying information within, or corresponding to, the selected section. In the case of a software asset that is not a direct download, the identifying information can be obtained from a file that is referenced in the selected section. In step 525, the system can determine whether the second identifying information matches the first identifying information. Responsive to determining that the second identifying information matches the first identifying information, the method can proceed to step 530. In step 530, the system can determine that the link is still in good standing, e.g., not broken, and references the original or intended software asset. After step 530, the system can continue to step 545 to determine whether any further sections remain to be processed in the link resolution file.

Responsive to determining that the second identifying information does not match the first identifying information, method 500 can proceed to step 535. In step 535, the system can determine that the URI is broken, e.g., no longer references the original or intended software asset. In step 540, the system optionally can send a notification to an administrator or to the author of the document. For example, the system can be configured to send a notification in the form of an electronic mail, a text message, etc. to the document administrator and/or author. In another aspect, the system can make a notation in the system to log the event of the mismatch for subsequent action.

In one aspect, one or more levels of alert or notification can be included that depend upon the number of mismatches detected by the system. The threshold between the two levels can be customized or adjustable. In illustration, the system can send a warning type of alert when one or more mismatches are detected for a given link resolution file. When a threshold is crossed, e.g., more than a particular number of mismatches are detected within a given link resolution file, the system can send an error notification that is considered to be more serious than the alert type of notification. The type of mismatch also can determine the type of error that is sent. Particular mismatched parameters, e.g., date, can be considered of lesser or greater importance than others thereby causing the system to send either an alert or an error notification depending upon the type of mismatch that occurs, the number of mismatches, or some combination thereof.

After step 540, the system can continue to step 545. In step 545, the system can determine whether the link resolution file includes any additional sections not yet checked. Responsive to determining that one or more sections have not yet been checked, method 500 can loop back to step 505 to select a next section for processing, e.g., to be checked. Responsive to determining that each section of the link resolution file has been checked, method 500 can end.

Updates to the URIs of software assets referenced in the document can be performed without having to remove the document from publication or even edit the document itself. For example, the author can start the system described within this specification, open the project for the document, and select the section link that must be updated. The user, working through the system, can edit the section and/or add the needed changes, e.g., an updated URI, and save the project. The project can be uploaded or saved to the server with the document. The document does not have to be uploaded or published again. Symbolic links in the document are then resolved, responsive to user selection, to the newly specified URI in the link resolution file.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "include" and/or "including," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of managing links, the method comprising:
   inserting, using a processor, a universal resource identifier for a software asset within a link resolution file, wherein a symbolic link within a document that is independent of the link resolution file references the link resolution file;
   publishing the document and the link resolution file; and
   responsive to a selection of the symbolic link within the document, resolving the symbolic link to the universal resource identifier using the link resolution file.

2. The method of claim 1, further comprising:
   determining first identifying information for the software asset; and
   storing the first identifying information in association with the universal resource identifier in the link resolution file.

3. The method of claim 2, wherein the software asset is a direct download and the first identifying information comprises a file name of the software asset, a size of the software asset, and a date for the software asset.

4. The method of claim 2, wherein the first identifying information is source code of the software asset.

5. The method of claim 2, further comprising:
   subsequent to determining the first identifying information, determining second identifying information for the software asset using the uniform resource identifier in the link resolution file;
   comparing the second identifying information for the software asset with the first identifying information for the software asset; and
   responsive to detecting a change between the first and the second identifying information, generating a notification.

6. The method of claim 1, further comprising:
   updating the uniform resource identifier for the software asset within the link resolution file without modifying the document.

7. The method of claim 6, further comprising:
   responsive to a further selection of the symbolic link within the document, resolving the symbolic link to the uniform resource identifier using the link resolution file.

8. A system for managing links, the system comprising:
   a processor configured to initiate executable operations comprising:
   inserting a universal resource identifier for a software asset within a link resolution file, wherein a symbolic link within a document that is independent of the link resolution file references the link resolution file;
   publishing the document and the link resolution file; and
   responsive to a selection of the symbolic link within the document, resolving the symbolic link to the universal resource identifier using the link resolution file.

9. The system of claim 8, wherein the processor is further configured to initiate executable operations comprising:
   determining first identifying information for the software asset; and
   storing the first identifying information in association with the universal resource identifier in the link resolution file.

10. The system of claim 9, wherein the software asset is a direct download and the first identifying information comprises a file name of the software asset, a size of the software asset, and a date for the software asset.

11. The system of claim 9, wherein the first identifying information is source code of the software asset.

12. The system of claim 9, wherein the processor is further configured to initiate executable operations comprising:
   subsequent to determining the first identifying information, determining second identifying information for the software asset using the uniform resource identifier in the link resolution file;
   comparing the second identifying information for the software asset with the first identifying information for the software asset; and
   responsive to detecting a change between the first and the second identifying information, generating a notification.

13. The system of claim 8, wherein the processor is further configured to initiate an executable operation comprising:

updating the uniform resource identifier for the software asset within the link resolution file without modifying the document.

14. A computer program product for managing links, the computer program product comprising:
   a computer readable storage medium having computer readable program code embodied therewith, the computer readable program code comprising:
   computer readable program code configured to insert a universal resource identifier for a software asset within a link resolution file, wherein a symbolic link within a document that is independent of the link resolution file references the link resolution file;
   computer readable program code configured to publish the document and the link resolution file; and
   computer readable program code configured to, responsive to a selection of the symbolic link within the document, resolve the symbolic link to the universal resource identifier using the link resolution file.

15. The computer program product of claim 14, further comprising:
   computer readable program code configured to determine first identifying information for the software asset; and
   computer readable program code configured to store the first identifying information in association with the universal resource identifier in the link resolution file.

16. The computer program product of claim 15, wherein the software asset is a direct download and the first identifying information comprises a file name of the software asset, a size of the software asset, and a date for the software asset.

17. The computer program product of claim 15, wherein the first identifying information is source code of the software asset.

18. The computer program product of claim 15, further comprising:
   computer readable program code configured to second identifying information for the software asset using the uniform resource identifier in the link resolution file subsequent to determining the first identifying information, determine;
   computer readable program code configured to compare the second identifying information for the software asset with the first identifying information for the software asset; and
   computer readable program code configured to, responsive to detecting a change between the first and the second identifying information, generate a notification.

19. The computer program product of claim 14, further comprising:
   computer readable program code configured to update the uniform resource identifier for the software asset within the link resolution file without modifying the document.

20. The computer program product of claim 19, further comprising:
   computer readable program code configured to, responsive to a further selection of the symbolic link within the document, resolve the symbolic link to the uniform resource identifier using the link resolution file.

\* \* \* \* \*